May 7, 1940.  J. K. HODNETTE  2,199,630
METER CIRCUIT PROTECTIVE MEANS
Filed July 9, 1938
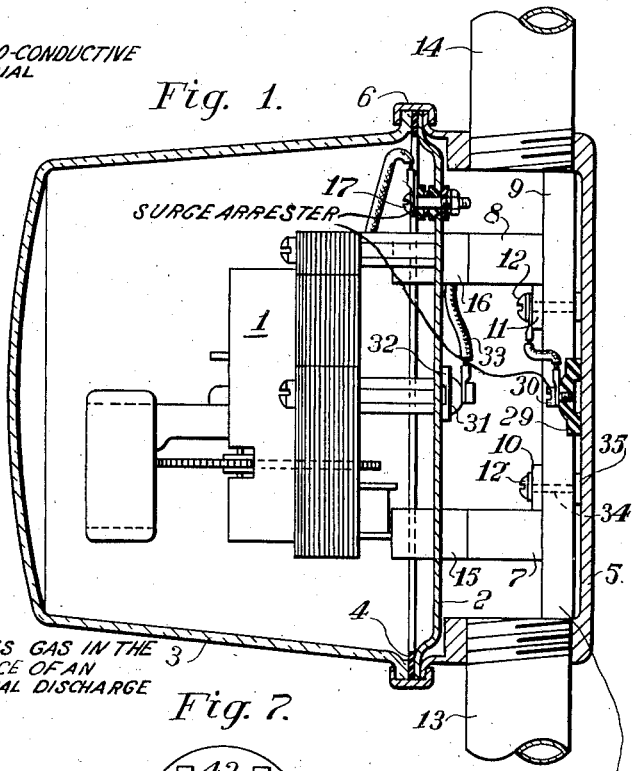
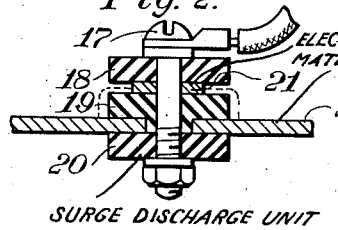
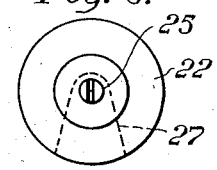
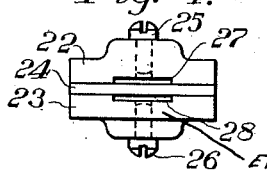
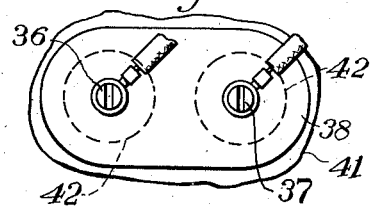
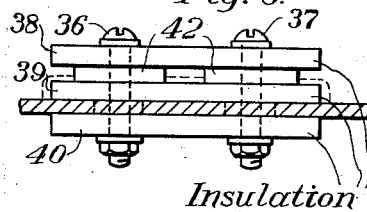
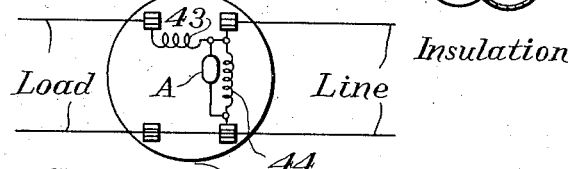
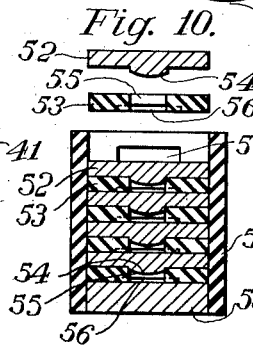
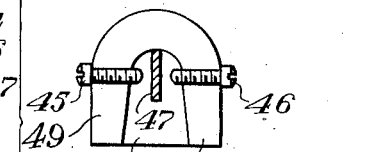
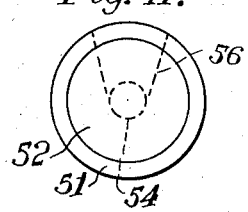
WITNESSES:
Edward Michaels
C. L. Friedman
INVENTOR
John K. Hodnette.
BY
ATTORNEY Patented May 7, 1940

2,199,630

UNITED STATES PATENT OFFICE 2,199,630

METER CIRCUIT PROTECTIVE MEANS

John K. Hodnette, Sharon, Pa., assignor to Westinghouse Electric & Manufacturing Company, East Pittsburgh, Pa., a corporation of Pennsylvania Application July 9, 1938, Serial No. 218,334

6 Claims. (Cl. 171—34)

This invention relates to an electric discharge device, and it has particular relation to a surgeproof meter protected against electric discharges.

Since the development of a successful detachable type of meter as depicted, for example, in the patents to Bradshaw et al. No. 1,969,499 and Allen et al. No. 2,076,491, the practice of mounting these meters in outdoor locations has grown very appreciably. In certain cases, these meters have been found to fail in a manner which could not be attributed to defects in manufacture or installation. I have found that these failures have been caused by the presence of electrical surges in the incoming line which cause an insulation failure in the coils of the meter.

Installations of the meters available prior to the introduction of the detachable type of meter invariably were in basements or rooms protected from the elements and surrounded by fuses, switches and poor wiring. These switches and fuses customarily were located ahead of the meter, so that when an electrical surge occurred on the incoming line, the fuses, switches and poor wiring ahead of the meter would offer a convenient discharge path for the electrical surges, and the meter itself would not be injured. When the detachable type of meter was found to be particularly suited to outdoor applications, a new sequence of metering was adopted, in which the meter preceded the switches and fuses. In such an installation, the meter must bear the brunt of any electrical surge on the incoming line whether due to lightning, electrical disturbances or other causes.

After analyzing the causes of meter failures, I next attacked the problem of protecting the meter against such failures. This can be accomplished by placing a surge protector or electric discharge device either ahead of the meter or in the same container with the meter. The former solution is less preferable for the reason that it complicates the meter installation, it may be overlooked readily during installation, it is a separate point of servicing, and it leaves the meter unprotected in the event that the surge protector has a poor ground.

At first it was thought that adequate protection could be obtained by weakening the insulation of a lead from the voltage coil of a meter to insure a failure of the lead instead of the coil when an electrical surge reaches the meter. Although such a failure would be easier to repair than a coil failure, it is unsatisfactory because the meter would be placed out of service upon the occurrence of a surge, and because of the absence of a provision for quenching the power discharge which follows the surge. From a practical standpoint it is difficult to calibrate the weakened lead to fail at a predetermined voltage. Consequently I adopted a completely independent surge protector.

By placing the surge protector in the same casing with the meter, the meter coils are held at a constant maximum voltage relative to the meter casing, regardless of the efficacy of the ground. Moreover, a ground usually is available through the conduits commonly employed for leading the line and load conductors into and out of the meter receptacles. The watthour meter manufacturer can supply the surge protector in the meter casing without requiring a separate installation at the time the meter is placed in service. Since the watthour meter element is delicate, it is common practice to provide the meter with a sound and sturdy casing for protection both against the elements and tampering. Such protection is automatically provided for the surge protector by placing it within the same cover. When the meter is detached for servicing, the surge protector at the same time is also opened to inspection. If it is desirable to confine the arcing or discharge of the protector, such an installation readily restricts the arcing or discharge to the meter casing. In addition, such a position of the protector is desirable because the meter terminals provide a ready source of connections for the protector. Finally, the surge protector may be combined with certain insulation present in the meter assembly with a resultant saving in parts.

Following my analysis of the cause of meter failures and its correction, I investigated the surge protectors available in the prior art. Invariably these were entirely too large for installation in many of the meter casings, because of the limited space available in certain classes of detachable meters. For this reason, I have found it desirable to develop a compact and positive surge protector, particularly suitable for use in the casings of electrical instruments. Such a surge protector may take the form of a pair of terminals separated to form a discharge gap, which breaks down when the voltage applied thereto rises above a predetermined value. Preferably, a material should be placed adjacent the electrical discharge which evolves a gas in the presence of an electrical discharge that aids in the suppression or quenching of the discharge. Such a material may be compressed boric acid, cellulose acetate, or a fibre commonly known as "hard fibre".

It is, therefore, an object of my invention to provide a surge-proof meter.

It is a further object of my invention to place a surge protector within a meter casing.

It is another object of my invention to include a surge protector in the socket of a detachable type of meter.

It is another object of my invention to provide a compact and positive electric discharge device suitable for use in a limited space.

Other objects of my invention will be apparent from the following description taken in conjunction with the accompanying drawing, in which:

Figure 1 is a view in section of a meter installation embodying my invention;

Fig. 2 is a view in section of an electric discharge device designed in accordance with my invention;

Figs. 3 and 4 are views in plan and side elevation, respectively, of a modified surge protector;

Figs. 5 and 6 are views in plan and side elevation, respectively, showing a still further modification of an electrical discharge device;

Fig. 7 is a diagrammatic view showing one installation of the surge protector shown in Figs. 5 and 6;

Figs. 8 and 9 are views in elevation and section, respectively, of a still further modification of an electrical discharge device; and Figs. 10 and 11 are views in exploded section and plan, respectively, of another modification of an electrical discharge device.

Referring to the drawing, Fig. 1 shows a meter installation of the detachable type, in which a meter unit 1 is mounted in a suitable cover receptacle which may comprise a base plate 2 attached in any desirable manner to a glass cover 3, a gasket 4 commonly being placed therebetween. This assembly is adapted to be mounted on a suitable base receptacle, such as a socket assembly 5, and retained in place thereon by a sealing ring 6, which engages flanges formed on the cover 3 and the socket 5. The socket 5 is provided with a plurality of contact jaws 7 and 8, which are mounted on a block of insulation 9. The jaws are provided with terminal extensions 10 and 11 which may carry terminal screws 12 for connection to line and load conductors which enter the socket through conduits 13 and 14. In this particular form of meter, the base plate 2 carries a plurality of contact blades 15 and 16 which are received in the contact jaws 7 and 8 when the meter is placed in position on its socket, and which are detached from the contact jaws when the meter is removed from its socket. These contact blades are attached to the coils of the meter 1. Further details of the construction of a detachable type of meter similar to that shown in Fig. 1 will be found in the above-mentioned patents.

In order to protect the meter against electrical discharges or surges, I place within the meter cover or socket one or more electrical discharge devices or surge protectors. These may be all of the same design or of different designs, and may be positioned in either the socket alone, the cover alone, or in both the socket and cover. One protector which I have found suitable for use in a meter installation comprises a bolt 17 which may be a terminal for one of the meter coils. This bolt is employed for attaching three insulating washers 18, 19 and 20 to the base plate 2. The bolt is bushed through the base plate 2 in any suitable manner, as by extending a bushing from the insulating member 19. Between the insulating members 18 and 19, I place a terminal washer 21, which is of electroconductive material. Although the terminals employed in my electrical discharge device may be of any suitable electroconductive material, I prefer to make them of a non-corrosive material, such as that commonly known as "stainless steel". If the base plate is of electroconductive material, as is ordinarily the case, a discharge path is provided between the terminal 21 and the base plate 2, as shown by the broken lines in Fig. 2. By suitable proportioning of the insulating member and the terminal 21, this discharge path may be designed to break down at any desired voltage. It will be noted that the discharge when it takes place passes through a restricted channel between the insulating members 18 and 19. By constructing these insulating members of material capable of evolving a gas in the presence of an electrical discharge, a discharge once formed will be rapidly quenched without damage to the coils or movable elements of the meter.

In the modification shown in Figs. 3 and 4, a pair of insulating members 22 and 23 are placed on opposite sides of a terminal member 24. The insulating members 22 and 23 carry terminal screws or lugs 25 and 26 which may be screwed into openings provided in the insulating members 22 and 23, or may be molded therein during manufacture. It will be noted that this electrical discharge device provides two discharge paths, one between the terminal members 24 and 25 and the second between the terminal members 24 and 26. Each discharge is directed into a channel 27 or 28 which is provided in the insulating member 22 or 23. If these insulating members are of a material which evolves gas in the presence of an electrical discharge, the quenching action of the discharge device will be greatly enhanced.

In Fig. 1, I have shown an electrical discharge device having an insulating member 29, which is similar to the insulating member 22 of Figs. 3 and 4, and a terminal 30, which corresponds to the terminal 25 of Figs. 3 and 4. However, instead of a separate terminal 24, the base of the socket 5 itself acts as a terminal for the electrical discharge device. In this particular installation, the terminal 30 is connected to the terminal extension 11 of the socket contact jaw 8, and prevents the voltage applied thereto from rising above a predetermined value.

On the base plate 2 I mount an additional electrical discharge device 31, which is similar in all respects to that described in the preceding paragraph, except for the presence of an additional terminal or ground member 32, which corresponds to the terminal member 24 of Fig. 4. Such an arrester may be employed either on the metallic base plate 2 or on an insulating base plate. As illustrated, this electrical discharge device 31 is connected through a conductor 33 either to a contact blade or directly to a terminal of one of the coils of the meter.

In order to simplify the construction of the installation, an electrical discharge device may be built into one of the parts that is required for the meter assembly. For example, in Fig. 1, an electrical discharge device is provided by attaching a lug or screw 34 to the terminal extension 10, as shown in dotted lines in Fig. 1. In this case, a channel 35 for the discharge may be provided between the insulation block 9 and the base of the socket 5. If the insulation block is formed of a material which evolves gas in the presence of an electrical discharge, this electrical discharge device will operate in the same manner as those previously described.

Although the conduits 13 and 14 may form a ground for the electrical discharge devices, if desired, a separate ground or other conductor may be taken from an electrical discharge device through either of the conduits.

If two electrical discharge devices similar to that shown in Fig. 2 are placed side by side, it is possible to provide an auxiliary gap without increasing the number of parts. Such a design is shown in Figs. 5 and 6, certain of the parts being combined for simplicity. In this figure, two terminal bolts 36 and 37 are employed for attaching three insulating members 38, 39 and 40 to a metallic terminal or base plate 41. Each of the bolts 36 and 37 is bushed through the terminal 41 in a manner analogous to that employed in Fig. 2. A meter terminal member 42 is provided for each of the terminal bolts 36 and 37 and is positioned between the two insulating members 38 and 39. As shown by the broken lines in Fig. 6, such an arrangement provides three discharge paths, one between the terminal bolts 36 and 37 and one between each terminal bolt and the terminal plate 41.

A simple installation of such an electrical discharge device is shown in Fig. 7 in which a watt-hour meter comprising a current coil 43 and a voltage coil 44 is connected to line and load conductors. Between the line conductors I connect a surge protector A similar to that shown in Figs. 5 and 6. Such a surge protector provides a discharge path between each line and ground and also between the line conductors. Since the current coil of Fig. 7 is connected to the voltage coil, a single electrical discharge device as shown ordinarily suffices for protecting both of the coils. Other meter coil arrangements may be protected by equivalent procedures. In Fig. 7, the outline and jaw structure of a meter socket similar to that illustrated in Fig. 1 are shown. Figs. 8 and 9 illustrate another suitable electrical discharge device in which a pair of terminal screws or lugs 45 and 46 and a partition member 47 are placed between two insulating blocks 48 and 49. As customary in this class of electrical discharge device, a channel 50 is provided for the electrical discharge. If the partition is an insulating partition, or if it is removed, a single discharge path is provided between the terminals 45 and 46, but if the partition 47 is electroconductive and is grounded, a separate discharge path is provided between each terminal 45 or 46 and the partition 47. Preferably, the blocks 48 and 49 are constructed of a material which evolves gas in the presence of an electrical discharge.

The modification shown in Figs. 10 and 11 is particularly suitable for high-voltage work. In this modification, an insulating tube 51 houses a plurality of terminal discs 52 and insulating discs 53. Each terminal disc 52 is provided with a protuberance 54 which is received in an opening 55 placed in the center of each insulating disc 53. The insulating disc 53 also carries a channel 56 which provides a discharge path for an electrical discharge formed between a projection 54 and an adjacent surface of the next terminal disc 52. An opening 57 preferably is provided through the insulating tube 51 to vent the electrical discharge carried through the channel 56. The lower terminal 58 may be a plain metal disc. In use, this protector would have a connection between the uppermost terminal disc 52 and the lower disc 58 to a circuit to be protected. By varying the number of insulating discs 53 and terminal discs 52, the protector may be designed to break down at various voltages as desired. If the insulating discs 53 are reduced in thickness, the protuberances 54 may be omitted and plain terminal discs 52 employed in their places. Preferably, the insulating discs 53 are capable of evolving a gas in the presence of an electrical discharge.

It is believed that the operation of my invention will be apparent from the foregoing description. When the meter is connected in circuit, it will operate in the customary way until an electrical surge appears on the incoming line. When this happens, the voltage across the protective electrical discharge devices or surge protectors rises above the value at which the surge protectors are designed to break down and the surge is discharged through the electrical discharge devices without harming the coils of the meter.

Certain subject matter herein disclosed is disclosed and claimed in my copending application, Serial No. 320,135, filed February 21, 1940.

Although I have described my invention with reference to certain specific embodiments thereof, it is obvious that many modifications thereof are possible. My invention is applicable generally to electrical instruments and devices other than watthour meters. The specific lightning arresters employed, their mountings and their locations in the casings may be varied appreciably without departing from my invention. Therefore, I do not wish my invention to be restricted except as required by the appended claims when interpreted in view of the prior art.

I claim as my invention:

1. In a detachable type of mounting for an electrical instrument, a base receptacle having first electrical contact members, a cover receptacle provided with second electrical contact members, said first contact members and second contact members coacting to establish electrical contact therebetween when said receptacles are in attached position and to break contact when said receptacles are separated, and an electrical surge discharge circuit for said instrument including an electrical surge protector positioned in one of said receptacles, said surge protector being electrically connected to at least one of said contact members.

2. In a detachable type of mounting for an electrical instrument, a base receptacle having first electrical contact members, a cover receptacle provided with second electrical contact members, said first and second contact members coacting to establish electrical contact therebetween when said receptacles are in attached position and to break contact when said receptacles are separated, and an electrical surge protector positioned in one of said receptacles and having a first terminal electrically connected to one of said members, the receptacle containing said surge protector having an electroconductive portion adjacent said surge protector and forming part of the surge discharge path of said surge protector.

3. In a detachable type of mounting for an electrical instrument, a base receptacle having first electrical contact members, a cover receptacle provided with second electrical contact members, said first and second contact members coacting to establish electrical contact therebetween when said receptacles are in attached position and to break contact when said receptacles are separated, an electrical surge protector positioned in one of said receptacles, the receptacle containing said surge protector having an electroconductive portion adjacent said surge protector and forming part of the surge discharge path of said surge protector, said surge protector having a terminal electrically connected to one of said members for producing an electrical discharge when a surge is applied thereto, and a body adjacent the region of said discharge which evolves gas in the presence of a discharge.

4. In a detachable type of mounting for an electrical instrument, a base receptacle having electrical contact elements, a cover receptacle provided with electrical contact members, said contact members and contact elements coacting to establish electrical contact therebetween when said receptacles are in attached position and to break contact when said receptacles are separated, and an electrical surge protector positioned in one of said receptacles, said protector having a terminal spaced from a portion of one of said receptacles, a structure defining a recess between said terminal and said portion, said structure being capable of evolving a gas in the presence of an electrical discharge, the terminal being positioned to produce an electrical discharge in said recess when an electrical surge reaches said surge protector.

5. In a socket for a detachable meter having electrical contact members, a receptacle, a plurality of electrical contact elements in said receptacle for establishing contact with said meter contact members, and an electrical surge discharge circuit for said meter including an electrical surge protector in said receptacle, said surge protector having a terminal connected to one of said contact elements.

6. In a socket for a detachable meter having electrical contact members, a receptacle, a plurality of electrical contact elements in said receptacle for establishing contact with said meter contact members, and an electrical surge protector in said receptacle, said surge protector having a pair of terminals each connected to a separate one of said contact elements, said terminals being positioned to provide an electrical discharge gap between the terminals and between each terminal and the receptacle.

JOHN K. HODNETTE.